United States Patent [19]

Miro et al.

[11] Patent Number: 5,518,973
[45] Date of Patent: May 21, 1996

[54] TITANIUM TRICHLORIDE CATALYST SYSTEM FOR POLYMERIZING OLEFINS

[75] Inventors: Nemesio D. Miro, Seabrook; William M. Chien, Houston, both of Tex.

[73] Assignee: Exxon Chemical Patents Inc., Wilmington, Del.

[21] Appl. No.: 137,863

[22] Filed: Oct. 15, 1993

[51] Int. Cl.$^6$ .................................................. B01J 31/00
[52] U.S. Cl. .................. 502/125; 502/102; 502/152; 526/126
[58] Field of Search ..................... 502/125, 152, 502/102

[56] References Cited

U.S. PATENT DOCUMENTS

| | | |
|---|---|---|
| 4,295,991 | 10/1981 | Wristers . |
| 4,990,477 | 2/1991 | Kioka et al. . |
| 4,990,479 | 2/1991 | Ishimaru et al. . |
| 5,244,989 | 9/1993 | Hara et al. .......................... 502/113 |

FOREIGN PATENT DOCUMENTS

| | | |
|---|---|---|
| 37155/93 | 11/1993 | Australia . |
| 0385765A2 | 9/1990 | European Pat. Off. . |
| 0435332A2 | 7/1991 | European Pat. Off. . |
| 0452156A2 | 10/1991 | European Pat. Off. . |

*Primary Examiner*—E. Rollins Cross
*Assistant Examiner*—E. D. Irzinski
*Attorney, Agent, or Firm*—Douglas W. Miller

[57] ABSTRACT

A $TiCl_3$ catalyst system is disclosed employing the electron donor, dicyclopentyldimethoxysilane ("DCPMS"). Additionally disclosed is a process for polymerizing olefins in the presence of a catalyst system employing a titanium trichloride catalyst, an alkylaluminum cocatalyst, and dicyclopentyldimethoxysilane is provided. The polymerization process comprises providing a prepolymerized titanium trichloride catalyst, and polymerizing an α-olefin in the presence of the prepolymerized catalyst, a trialkylaluminum co-catalyst and dicyclopentyldimethoxysilane. The catalyst system of the invention provides increased catalyst activity for a $TiCl_3$ catalyst and a very broad polymer molecular weight distribution.

8 Claims, No Drawings

5,518,973

TITANIUM TRICHLORIDE CATALYST SYSTEM FOR POLYMERIZING OLEFINS

BACKGROUND

1. Field of the Invention

The present invention relates to catalyst components for olefin polymerization which can produce polyolefins in high yield with minimal amounts of by-product amorphous polymer. Additionally provided is a process for polymerizing olefins in the presence of the instant catalyst components.

2. Description of the Prior Art

Titanium trichloride obtained by reduction of titanium tetrachloride is well known as a catalyst used for the stereo-regular polymerization of α-olefins and is amply demonstrated in the prior art including U.S. Pat. Nos. 4,321,346 and 4,401,799. The '346 and '799 patents teach a titanium trichloride reduced solid prepared by reducing titanium tetrachloride with well known organometallic compounds and thereafter utilizing the recovered reduced solid titanium trichloride catalyst in an α-olefin polymerization carried out in the presence of an alkyl aluminum co-catalyst.

In U.S. Pat. No. 4,295,991 to Wristers, the additional advantage of prepolymerizing the titanium trichloride reduced solid prior to catalyst use with an α-olefin to achieve catalyst particles demonstrating little friability. Generally this prepolymerization requires that the reduced solid titanium trichloride catalyst be charged into a reactor with a co-catalyst such as diethylaluminum chloride and an α-olefin, such as propylene, whereby polymerization of the olefin takes place at an elevated temperature.

In order for a solid catalyst to satisfactorily perform in the polymerization of α-olefins, the following five characteristics are required of the catalyst: (1) a high level of polymerization; (2) a minimum contamination of the produced polymer (3) no corrosive effects on the apparatus used for the polymerization; (4) maintenance of the catalytic activity over the period of polymerization; and (5) high bulk specific gravity of the produced polymer.

In addition to the development of new catalysts and new reaction processes, the discovery of appropriate co-catalysts or electron donors for enhancement of catalyst systems has added to the polymerization art. In such a total catalyst system, a co-catalyst activates the catalyst and provides the initiation of the polymer chain. The co-catalyst that works well with titanium catalysts is an organoaluminum compound, most typically triethylaluminum ("TEAL") or another trialkylaluminum. Examples of other useful organoaluminum compounds include an alkylaluminum dihalide, a trialkoxyaluminum, a dialkylaluminum, a dialkylaluminum halide, a triisobutylaluminum.

An electron donor compound is used in the polymerization reaction to reduce the atactic form of the polymer thereby giving control of and increasing the production of isotactic polymers. Although a broad range of compounds are known generally as electron donors, a particular catalyst may have a specific compound of group of compounds with which it is especially compatible. Discovery of an appropriate type of electron donor can lead to significant increases in catalyst efficiency as well as to improved control of the isotactic index of the desired polymer product and other properties of the product such as molecular weight distribution and melt flow. Discovery of electron donors for a particular type of catalyst that provide such results would be advantageous.

The prior art is replete with the use of many electron donors as part of the components of a Ziegler-Natta type catalyst to enhance catalytic activity in an olefin polymerization process is well known in the prior art. In titanium tetrachloride supported catalysts, esters and silane compounds of many varieties have been described as electron donor-enhancer materials. Among the silane compounds that have been described as an effective electron donor-enhancer is dicyclopentyldimethoxysilane ("DCPMS") as is amply demonstrated with U.S. Pat. Nos. 4,990,477 and 4,990,479 both of which relate to a magnesium supported titanium tetrachloride catalyst. With respect to unsupported titanium trichloride reduced solid catalysts, one common electron donor-enhancer used in the polymerization of α-olefins is methylmethacrylate ("MMA"). It has been generally found that electron donors otherwise known for their valuable results with supported catalysts do not perform as well as the known unsupported electron donors such as MMA. The present invention is directed to one exception to that generalization in the discovery that the electron donor dicyclopentyl-dimethoxysilane in combination with unsupported titanium trichloride forms a catalyst system generating unexpected results in the polymerization of α-olefins.

SUMMARY OF THE INVENTION

The present invention provides a catalyst system for the polymerization of olefins wherein the catalyst system includes the combination of a titanium trichloride catalyst component with dicyclopentyldimethoxysilane which results in unexpectedly high catalytic activity and improved control over properties of the polymer product than otherwise achievable with present state of the art reduced $TiCl_3$ and electron donor combination catalytic systems.

Specifically, the invention is directed to a catalyst system for the polymerization of olefins comprising:

a) a titanium trichloride catalyst component; and b) the electron donor dicyclopentyldimethoxysilane. The titanium trichloride catalyst component may be prepared by (i) reducing $TiCl_4$ with an alkylaluminum halide compound at low temperatures; (ii) prepolymerizing the titanium reduced solid with an α-olefin; and (iii) activating the prepolymerized solid $TiCl_3$. In addition, the system may contain an organoaluminum compound which acts as a co-catalyst. Particular organoaluminum co-catalysts which work well with the instant catalyst components are trialkylaluminums. Examples of other useful trialkylaluminum compounds include an trimethylaluminum, a triisobutylaluminum, and trioctylaluminum. The most preferred tri-alkylaluminum co-catalyst is TEAL.

The invention also provides a catalyst system as described above, wherein the system is capable of polymerizing an olefin monomer with a catalyst efficiency of about 16.3 kilograms of polymer per gram of $TiCl_3$ catalyst in a three hour period. Particular catalyst systems included in the invention may demonstrate somewhat lower efficiencies. The catalyst system may be further characterized by an efficiency greater than 16.3 while producing a polymer product with melt flow values within the range of 0.100 to 10.0 g/10 min.

The catalyst system may be even further characterized by having an isotactic capacity such that the system produces a polymer product in which the heptane soluble atactic form may be kept at less than of the product. The system may be still further characterized by an ability to accurately control the molecular weight distribution ("MWD") of the product within the range of 6.6–8.9 at any particular melt flow index of the product within the range of 1–10 g/10 min.

The invention also provides a process for the polymerization of olefins, particularly, propylene. The process comprises:

a) providing a titanium trichloride catalyst;

b) contacting the catalyst component with an organoaluminum compound;

c) contacting the catalyst component with the electron donor dicyclopentyldimethoxysilane, either simultaneously with or after step b), to form a catalyst system;

d) introducing the catalyst system into a polymerization reaction zone containing an olefin monomer; and e) polymerizing said monomer.

As in the catalyst system, the titanium trichloride catalyst used in the instant process may be prepared by (i) reducing $TiCl_4$ with an alkylaluminum halide compound at low temperatures; (ii) prepolymerizing the titanium reduced solid with an α-olefin; and (iii) activating the prepolymerized solid $TiCl_3$. The process further comprises withdrawing a crystalline polymer product in which the heptane solubles are less than 8% of the polymer product, while the Al/Si ratio in the reaction zone is within the range of 3.3–15.

The instant catalyst system provides a high activity α-olefin polymerization process resulting in a polymer product of broad molecular weight and having an acceptable crystallinity (heptane insoluble portion). The higher activity of the present system translates to lower catalyst cost and hence lower polymer production costs.

DETAILED DESCRIPTION OF THE INVENTION

The present invention is specifically directed to a catalyst system comprising a prepolymerized reduced solid $TiCl_3$ catalyst, an alkylaluminum co-catalyst, and dicyclopentyldimethoxysilane. This combination results in a catalyst system that has a catalyst efficiency significantly higher than those provided by prior art $TiCl_3$ unsupported catalyst systems as illustrated by the comparative data included below. Further, the catalyst system of the present invention retains most of its high activity over time. The catalyst system also provides good control of the heptane insolubles and broader molecular weight distribution of the polymer product than with those $TiCl_3$ catalyst systems employing conventional electron donors ordinarily used with these $TiCl_3$ unsupported catalysts. These and other beneficial advantages will become more apparent from the following detailed description of the invention and the accompanying examples.

Electron donors are typically used in two ways in the formation of a Ziegler-Natta catalyst system. First, an internal electron donor may be used in the formation reaction of the catalyst as the transition metal halide is reacted with the metal hydride or metal alkyl. Examples of internal electron donors are replete in the prior art and include amines, aromatic esters, phosphines and silanes, among countless other chemical groups. The second use for an electron donor in a catalyst system is as an external electron donor and stereo-regulator in the polymerization reaction. The same compound may be used in both instances, although typically they are different. The silane compound, dicyclopentyldimethoxysilane, is known as a common external donor for supported $TiCl_4$, but heretofore has not been used with unsupported prepolymerized $TiCl_3$ catalyst systems. U.S. Pat. No. 4,535,068 provides a description of the two types of electron donors.

Because the present invention relates to external donors, the term "electron donor", as used herein, refers to the external donor which acts as a stereo-regulator to control the amount of atactic form of α-olefin polymer produced. The DCPMS electron donor used herein also unexpectedly increases the production of isotactic α-olefin polymers and consequently the crystallinity of these polymers.

The effectiveness of the electron donor depends largely on its compatibility with the catalyst with which it is used. There appears to be some electrical and/or steric compatibility between certain donors and catalysts that yields better results than with the same catalyst and other donors. This compatibility assimilation process between catalysts and electron donors is neither understood nor predictable. This problem illustrates the discovery of the present invention that DCPMS operates unexpectedly with unsupported prepolymerized $TiCl_3$ which has generally been found compatible with electron donors such as methylmethacrylate.

The titanium trichloride reduced solid catalyst used in the present invention is obtained by reducing titanium tetrachloride with an organoaluminum compound and preferably an alkylaluminum halide at low temperature of from about −50° C. to 30° C. as described in U.S. Pat. No. 4,321,364 to Ueno et al., which disclosure is hereby incorporated by reference. The alkylaluminum halide employed can be any suitable alkylaluminum compounds well known as reducing agents in the art, such as trialkyl aluminums, dialkyl aluminum halides, monoalkylaluminum dihalides, alkylaluminum sesquihalides, mixtures or complex compounds thereof.

The titanium trichloride reduced solid obtained by the above described prior art processes can be prepolymerized, that is, contacted with a polymerizable α-olefin under polymerization conditions, directly without the addition of a reducing co-catalyst or, the reduced solid can be separated, washed in an inert solvent or diluent, if desirable, and then prepolymerized upon addition of a co-catalyst (aluminum alkyl) as it is or after drying in a conventional manner.

In accordance with the present invention, the α-olefins which can be employed in the prepolymerization step desirably have three to twenty-two, and preferably three to eight carbon atoms. Illustrative of α-olefins which can be employed in accordance with this invention during the prepolymerization step are propylene, butene-1, pentene-1, hexene-1, heptene-1, 4-methyl-pentene-1 and the like. Preferably the α-olefin chosen will contain from three to eight carbon atoms and most preferably the α-olefin will be propylene.

The conditions of prepolymerization are well known to those skilled in the art and are adequately outlined in U.S. Pat. No. 4,295,991 to Wristers, the disclosure of which is herein incorporated by reference. Additionally, all other aspects of preparation of the reduced solid catalysts, including activation, are set-forth in this patent to Wristers. The prepolymerized reduced solid $TiCl_3$ catalyst can be employed as a non-friable polymerization catalyst component in the catalyst system of the present invention.

As indicated above, when the prepolymerized $TiCl_3$ reduced solid catalyst component is charged into a polymerization reactor containing an α-olefin, the electron donor DCPMS, and the alkylaluminum cocatalyst triethylaluminum, polymerization of the α-olefin takes place demonstrating a very high catalyst efficiency and a highly crystalline polyolefin as demonstrated by a higher heptane insolubility than that generally expected for polyolefins prepared with prior art TiCl$_3$ catalyst systems typically employing (a) a prepolymerized TiCl$_3$ reduced solid catalysts; (b) an alkylaluminum cocatalyst; and (c) a conventional unsupported catalyst donor such as MMA.

The following examples demonstrate the high efficiency and optimum crystallinity achieved in the polymerization of polypropylene utilizing the present catalyst system comprising (a) a reduced prepolymerized solid TiCl$_3$ catalyst component; (b) a trialkylaluminum cocatalyst; and (c) the silane electron donor, dicyclopentyldimethoxysilane. The catalyst system is prepared by (a) reducing TiCl$_4$ with an organoaluminum compound at low temperatures (e.g., −50° C. to 30°°C.; prepolymerizing the reduced TiCl$_3$ product with about 1 to 1,000 weight percent α-olefin; and (b) activating the prepolymerized reduced solid by treating it with a halogenated hydrocarbon and a Lewis base complexing agent. A preferred halogenated hydrocarbon is hexachloroethane.

In accordance with the present invention the activation step, i.e., the conversion of the prepolymerized reduced solid to a highly crystalline form of titanium trichloride is accomplished by contacting the prepolymerized reduced solid with either a chlorinated hydrocarbon and Lewis base complexing agent or a Lewis acid and Lewis base complexing agent. A variety of chlorinated hydrocarbons can be employed during activation as, for example, the chlorinated products of aliphatic and aromatic hydrocarbons. The chlorinated products of the aliphatic saturated hydrocarbons are generally more effective. Desirably the chlorinated aliphatic hydrocarbons will have from about 2 to 8 carbon atoms and from about 2 to 6 chlorine atoms per molecule. The most preferred chlorinated hydrocarbons are the chlorinated ethanes. The effect of the chlorinated hydrocarbons appears to increase with the increased number of chlorine atoms per molecule desired. Desirably, therefore, the chlorinated hydrocarbons employed can be one of hexachloroethane, pentachloroethane, tetrachloroethane, trichloroethane. Most preferably the chlorinated hydrocarbon will be hexa-chloroethane.

The specific temperatures and the amount of organoaluminum compound employed during the reduction step can be varied within ranges well known in the art. For example, specific organoaluminum compounds will require certain optimum concentration and temperature ranges. In the case of diethylaluminum chloride ("DEAC") it is preferable to carry out the reduction at temperatures of about −50° C. to about 30° C. and to use DEAC in a proportion of about 0.5 moles to about 5 moles to 1 mole of TiCl$_4$.

The titanium trichloride reduced solid obtained as described above can be prepolymerized, i.e., contacted with a polymerizable α-olefin under polymerization conditions, directly without the addition of a reducing co-catalyst or it can be separated, washed in an inert solvent or diluent, if desirable, and then prepolymerized upon the addition of a co-catalyst (alkylaluminum) as it is or after drying in a conventional manner.

The α-olefin employed in accordance with the present invention for the prepolymerization of the titanium trichloride reduced solid can be added directly to the reaction product of the reduction step or it can be added to the washed reaction product in a suitable solvent. The amount of α-olefin employed can be in a mole ratio per total titanium halide reduced solid employed in a range of about 0.03 to 3000 times, and particularly at about 0.1 to 0.5 times. The mole ratios employed, therefore, will desirably provide a titanium halide prepolymerized with about 1 to 1,000 weight percent of α-olefin based on the titanium halide and desirability from about 3 to about 100 weight percent and most preferably from about 6 to 30 weight percent of α-olefin based on the weight of titanium halide.

The system also provides a broad molecular weight distribution in the polymer product. The MWD, defined as $M_w/M_n$, of α-olefin polymer products prepared with TiCl$_3$ is generally broader than products prepared with supported TiCl$_4$ catalysts. However, the MWD of α-olefin polymers prepared with the instant catalyst system will have unexpectedly broader range of from 6.6 to 8.9 for any particular melt flow within the range 1–50 g/10 min. than the MWD ordinarily expected with TiCl$_3$ catalyst. This ability to achieve broad MWD has operational advantages in that it improves the melt strength of the polymer during processing. Additionally, it improves the ease of processing the prepared resin for end product use as in the extrusion of polymer product for film use.

EXAMPLES

Preparation of the Catalyst:

The catalyst used in the examples outlined in the following tables was prepared according to the well known process outlined in U.S. Pat. No. 4,295,991, but using 35% prepolymer of propylene and activated with hexachloroethane. The resulting prepolymerized catalyst was slurried as a 30 weight percent mixture in mineral oil or as a 42 weight percent mixture in hexane.

Polymerization Procedure:

Lab-scale polymerization was carried out in a 2 liter stainless steel autoclave reactor that had been purged with nitrogen prior to use. The required amount of aluminum alkyl in hexane solution was charged into the reactor, followed by charging the specified polymerization donor solution in hexane. The required amount of hydrogen measured by the pressure drop (psi) from a 0.30 liter bomb container was introduced into the reactor, followed by introducing 1000 ml of liquid propylene. The reactor mixture was agitated at room temperature and then the temperature was brought to 70° C. over a period of 5 to 10 minutes. The required amount of catalyst slurry in mineral oil or hexane and measure in terms of g TiCl$_3$ was introduced by flushing the catalyst into the reactor with 250 ml propylene, and the polymerization was allowed to continue for one hour. The resulting polymer, after venting the excess propylene, was dried in a vacuum oven and then pelletized to prepare sample for HI, MFR, and Ti measurements. The productivity of the catalyst was calculated from the Ti analysis of the polymer by X-ray and productivity based on TiCl$_3$.

Heptane Insolubility, Activity and Yield:

Heptane insolubles of all polymers were determined as follows. After completion of the polymerization, the resultant polymer was collected and dried at 80° C. under reduced pressure, and the amount of the polymer obtained was designated arbitrarily as (A). This polymer, after pelletizing, was extracted with boiling n-heptane for 6 hours to obtain a polymer insoluble in n-heptane, and the amount of this polymer was designated arbitrarily as (B).

The polymerization activity (C) per solid catalyst component used is calculated according to the following equation:

$$C = \frac{(A)(g)}{\text{Amount of the said catalyst component }(g)}$$

The yield of the total crystalline polymer (D) is calculated according to the following equation:

$$(D) = \frac{(B)}{(A)} \times 100(\%)$$

The following tables indicate tabulation of the numerous example runs and demonstrate clearly the unexpected activity of DCPMS as compared with the electron donor MMA, a typically used donor with reduced solid $TiCl_3$ unsupported catalysts.

TABLE I

STARTED PRE-MIX DONOR/TEAL STUDY

| Polym Run | Donor Type | Donor Amount MMole | Alkyl Type | Alkyl Amount MMole | Catalyst Cat (mg) | Amount Ti (mg) | Polym Time (HR) | Polym Yld | Ti (ppm) | Prod Ti (kgpp/gcat) | MFR | HI |
|---|---|---|---|---|---|---|---|---|---|---|---|---|
| 1 | DCPMS | 0.3 | TEAL | 2 | 34.3 | 10.6 | 3 | 569 | 18.7 | 16.6 | 1.61 | 93.7 |
| 2 | DCPMS | 0.6 | TEAL | 2 | 28.7 | 8.9 | 2 | 318 | 28 | 11.1 | 1.71 | 95.7 |
| 3 | DCPMS | 0.3 | TEAL | 2 | 25.6 | 7.94 | 2 | 294 | 27 | 11.5 | 2.78 | 94.4 |
| 4 | DCPMS | 0.3 | TEAL | 2 | 29.3 | 9.09 | 2 | 368 | 24.7 | 12.6 | 1.95 | 94.2 |
| 5 | DCPMS | 0.3 | TEAL | 1.5 | 25.7 | 7.98 | 4 | 420 | 19 | 16.3 | 1.22 | 95.2 |
| 6 | *DCPMS | 0.2 | TEAL | 2 | 48.4 | 15.0 | 1 | 417 | 36 | 8.61 | 0.658 | 93.2 |
| 7 | *DCPMS | 0.3 | TEAL | 2 | 43.5 | 13.5 | 2 | 435 | 31 | 10.0 | 0.578 | 94.6 |
| 8 | *DCPMS | 0.6 | TEAL | 2 | 29.4 | 9.12 | 4 | 308 | 24 | 12.9 | 2.42 | 94.7 |

*DCPMS and TEAL were charged separately with reactors.

TABLE II

MIXED DONOR SYSTEM

| Polym Run | Donor Type | Donor Amount MMole | Alkyl Type | Alkyl Amount MMole | Catalyst Cat (mg) | Amount Ti (mg) | Polym Time (HR) | Polym Yld | Ti (ppm) | Prod Ti (Kgpp/gcat) | MFR | HI |
|---|---|---|---|---|---|---|---|---|---|---|---|---|
| 9 | DCPMS TEOS | 0.3 0.1 | TEAL | 2 | 27.4 | 8.49 | 4 | 369 | 23 | 13.5 | 2.15 | 94.6 |

TABLE III

PREPOLY CATALYST WITH DCPMS

| Polym Run | Donor Type | Donor Amount MMole | Alkyl Type | Alkyl Amount MMole | Catalyst Cat (mg) | Amount Ti (mg) | Polym Time (HR) | Polym Yld | Ti (ppm) | Prod Ti (Kgpp/gcat) | MFR | HI |
|---|---|---|---|---|---|---|---|---|---|---|---|---|
| 10 | DCPMS | 0.3 | TEAL | 2 | 25.3 | 7.83 | 2 | 255 | 30.7 | 10.1 | 2.33 | 94.4 |
| 11 | TEOS | 0.3 | TEAL | 2 | 23.6 | 7.32 | 2 | 286 | 25.6 | 12.1 | 2.96 | 87.4 |

TABLE IV

COMPARISON I

| Polym Run | Donor Type | Donor Amount MMole | Alkyl Type MMole | Alkyl Amount | Catalyst Cat (mg) | Amount Ti (mg) | Polym Time (HR) | Polym Yld | Ti (pfm) (Kg/g) | Prod Ti | MFR | HI |
|---|---|---|---|---|---|---|---|---|---|---|---|---|
| 12 | MMA | 0.0 | DEAC | 9.3 | 62.2 | 19.3 | 1 | 292 | 70.8 | 4.38 | 4.43 | 95.6 |
| 13 | MMA | 0.3 | DEAC | 4.63 | 30.0 | 9.3 | 2 | 239 | 38.3 | 8.09 | 4.81 | 95.7 |

TABLE V

COMPARISON II
DONOR AND ALKYL STUDY

| Polym Run | Donor Type | Donor Amount MMole | Alkyl Type | Alkyl Amount MMole | Catalyst Cat (mg) | Amount Ti (mg) | Polym Time (HR) | Polym Yld | Ti | Prod Ti (Kgpp/gcat) | MFR | HI |
|---|---|---|---|---|---|---|---|---|---|---|---|---|
| 14 | DCPMS | 0.3 | DEAC | 4.65 | 23.9 | 7.41 | 4 | 427 | | Polymer obtained was too sticky to process, HI < 90 | | |
| 15 | DPMS | 0.2 | TEAL | 2 | 43.5 | 13.5 | 1 | 377 | 31 | 10 | 1.91 | 87.8 |
| 16 | DPMS | 0.2 | TEAL | 2 | 30.4 | 9.41 | 1 | 181 | 52 | 5.96 | 1.94 | 90 |
| 17 | PTES | 0.2 | TEAL | 2 | 33.5 | 10.4 | 2 | 371 | 28 | 11.1 | 5.15 | 81.8 |
| 18 | PTES | 0.3 | DEAC | 4.65 | 21.2 | 6.56 | 4 | 349 | 18.8 | 16.5 | 5.5 | 90.4 |

TABLE VI

COMPARISON III
MIXED ALKYL SYSTEM

| Polym Run | Donor Type | Donor Amount MMole | Alkyl Type | Alkyl Amount MMole | Catalyst Cat (mg) | Amount Ti (mg) | Polym Time (HR) | Polym Yld | Ti | Prod Ti (Kp/ggcat) | MFR | HI |
|---|---|---|---|---|---|---|---|---|---|---|---|---|
| 19 | DCPMS DEAC | 0.3 0.58 | TEAL | 2 | | | | Polymer was too sticky to proess, HI < 90 | | | | |

TABLE VII

| | Invention Catalyst TEAL + DCPMS Co-Catalyst | Comparison Catalyst DEAC + MMA Co-Catalyst |
|---|---|---|
| RMA-MWD | 7.378 | 5.371 |
| MFR | 1.93 | 2.81 |
| HI | 95.00 | 95.00 |

Table I shows the effect of first premixing the TEAL and DCPMS before being charged into the reactor. This is the recommended procedure to prevent over reduction of the Ti-active centers in the catalyst. The results show the effect of polymerization time up to 3 hours. For polymerization longer than 3 hours, there was insufficient physical capacity in the reactor to make any more polymer. The result also shows that by increasing the amount of DCPMS a higher HI of 95.7 was obtained. The polymerization conditions outlined above were used throughout. In the cases where there was no premixing of the DCPMS with TEAL (runs 6 and 8), significant activity was observed for up to a two hour period. However, increasing the polymerization time to four hours showed very little increase in productivity which is attributable to the over reduction of the Ti-active centers.

Table II demonstrates the results of mixing DCPMS and TEOS. The data indicates that it is possible to mix DCPMS with another donor and still get acceptable results. Note run 9 which demonstrates that the instant DCPMS donor can be used in combination with otherwise unacceptable donors and still achieve results within the purview of the present invention.

Table III illustrates the use of a catalyst that had been prepolymerized with DCPMS as donor and TEAL as co-catalyst. During the reactor polymerization of run 11, both DCPMS and TEOS were used as donor, but only the sole use of TEOS produced a polypropylene polymer having 87.4% HI. The comparative result of this table demonstrates that DCPMS still is required as a donor component in the polymerization of the α-olefin. Sole use of the alternative donor, triethoxysilane, was ineffective in achieving acceptable HI insolubility (crystallinity).

Table IV enables comparison of the instant catalyst system with MMA and demonstrates that MMA achieves less activity. Note the activity in run 12 as compared to that of run 6, where the DCPMS has approximately double the activity of MMA. Comparison of MMA run 13, (at two hours) and DCPMS run 4 (also at two hours) is confirmatory of the unexpected activity of DCPMS. At a two hour polymerization time, the productivity of the MMA/TiCl$_3$ catalyst system is only about 65% of the best two hour polymerization result for the instant invention catalyst system of the present invention.

Table V is a further comparison illustrating the effects of using different combinations of alkyl co-catalyst and conventional donors: DCPMS with DEAC, DPMS (diphenyldimethoxysilane) with TEAL, and PTES (propyltriethoxysilane) with either TEAL or DEAC. All of these runs gave polymer with HI lower than 92%, indicating an unacceptable crystallinity level.

Table VI illustrates that when mixing some DEAC with TEAL as co-catalyst, a polymer with very low HI was obtained. This table is another comparison demonstrating that the use of unacceptable co-catalysts (DEAC) with the preferred triethylaluminum is unsuitable in achieving the desired results obtained when using DCPMS solely in combination with suitable trialkylaluminum co-catalysts to form the catalyst system of the present invention.

Table VII compares the MWD of polymers made with the invention catalyst system with the standard TiCl$_3$-DEAC/MMA system. The results show the broader MWD characteristic of the catalyst system of the present invention.

The preferred embodiments of the present invention, as described above, are not intended to limit the scope of the present invention, as demonstrated by the claims which follow, since one skilled in the art can, with minimal experimentation, extend the scope of the embodiments to match the claims.

What is claimed:

1. A catalyst system for the polymerization of olefins consisting essentially of:

(a) an unsupported solid titanium trichloride catalyst component prepared by (i) reacting $TiCl_4$ with a reducing agent to form solid $TiCl_3$;

(ii) prepolymerizing the titanium reduced solid with an α-olefin; and (iii) activating the prepolymerized solid $TiCl_3$ by treatment with a halogenated hydrocarbon and a Lewis base;

(b) triethylaluminum cocatalyst; and (c) dicyclopentyldimethoxysilane.

2. The catalyst system of claim 1 wherein the titanium trichloride catalyst system is prepared by reducing $TiCl_4$ with an alkylaluminum halide compound at temperatures of from about −50° C. to about 30° C.

3. The catalyst system of claim 1 wherein said halogenated hydrocarbon is selected from the group consisting of hexachloroethane, pentachloroethane, tetrachloroethane, and trichloroethane.

4. A catalyst system for polymerization α-olefins consisting essentially of:

a) an unsupported titanium trichloride prepared by;
  i) reacting $TiCl_4$ with a reducing agent forming $TiCl_3$;
  ii) prepolymerization said $TiCl_3$
  iii) activating the $TiCl_3$; and b) an organoaluminum cocatalyst; and c) dicyclopentyldimethoxysilane.

5. The catalyst system of claim 4 wherein said organoaluminum cocatalyst is selected from the group consisting of an triisobutyl aluminum, trimethylaluminum, triethylaluminum, and trioctylaluminum.

6. The catalyst system of claim 4 wherein said $TiCl_3$ is activated by an activator selected from the group consisting of; a Lewis base and chlorinated hydrocarbon; and a Lewis base and a Lewis acid.

7. The catalyst system of claim 4 wherein said $TiCl_3$ is activated by a Lewis base and a chlorinated hydrocarbon selected from the group consisting of hexachloroethane, pentachloroethane, and tetrachloroethane, and trichloroethane.

8. A propylene polymerization catalyst system consisting essentially of:

a) an unsupported $TiCl_3$ catalyst component prepared by;
  i) reacting $TiCl_4$ with an alkylaluminum selected from the group consisting of trialkylaluminum halide, diakylaluminum halide, monoalkylaluminum dihalides, alkylaluminum sesquehalides, mixtures thereof and complex compounds thereof;
  ii) prepolymerization the $TiCl_3$ with propylene;
  iii) activating the prepolymerized $TiCl_3$ by treatment with hexachloroethane and a Lewis base;

b) triethylaluminum; and c) dicyclopentyldimethoxysilane.

* * * * *